US008504902B2

(12) United States Patent
Shi et al.

(10) Patent No.: US 8,504,902 B2
(45) Date of Patent: Aug. 6, 2013

(54) METHODS AND APPARATUS FOR VIRTUALLY CONNECTED COMMUNICATION MODES

(75) Inventors: Jianxiong Shi, Pleasanton, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 12/878,892

(22) Filed: Sep. 9, 2010

(65) Prior Publication Data

US 2011/0070900 A1 Mar. 24, 2011

Related U.S. Application Data

(60) Provisional application No. 61/240,912, filed on Sep. 9, 2009.

(51) Int. Cl.
*H04W 88/02* (2009.01)
(52) U.S. Cl.
USPC ............... 714/799; 455/550.1; 455/115.3; 455/296; 714/100
(58) Field of Classification Search
USPC ........... 455/410, 458, 428, 455, 412.1, 412.2, 455/414.1, 95, 550.1, 561, 63.1, 67.13, 114.2, 455/115.1, 115.3, 130, 134, 135, 296; 714/1, 714/100, 799
See application file for complete search history.

(56) References Cited

U.S. PATENT DOCUMENTS

| | | | |
|---|---|---|---|
| 6,693,886 B1 * | 2/2004 | Haikonen et al. | 370/338 |
| 6,879,832 B1 * | 4/2005 | Palm et al. | 455/445 |
| 7,606,190 B2 * | 10/2009 | Markovic et al. | 370/328 |
| 8,165,585 B2 * | 4/2012 | Gallagher et al. | 455/436 |
| 2008/0305768 A1 * | 12/2008 | Nylander et al. | 455/410 |

OTHER PUBLICATIONS

Radio Resource Control (RRC); Protocol Specification (Release 8) 3GPP TS 25.331 V8.0.0 (Sep. 2007) 81 pages.
3rd Generation Partnership Project; Technical Specification Group Radio Access Network; Requirements for Further Advancements for E-UTRA (LTE-Advanced) (Release 8); 3GPP TR 36.913 V8.0.0 (Jun. 2008) 14 pages.

* cited by examiner

*Primary Examiner* — Cong Tran
(74) *Attorney, Agent, or Firm* — Gazdzinski & Associates, PC

(57) ABSTRACT

Methods and apparatus enabling a wireless network to implement efficient and robust paging channel operation. In one aspect, the invention permits recovery of a paging channel after a virtual connection failure. A virtually connected UMTS cellular phone that misses a paging notification will no longer be synchronized with its serving radio network, and the resultant loss of synchronization causes a service "blackout" until the devices are resynchronized. Accordingly, in one embodiment, a virtually connected cellular device continuously monitors for fallback messaging, greatly expediting detection and correction of a virtual connection failure. In another embodiment, a virtually connected base station which is unable to page a cellular device in a virtually connected mode continues paging in both virtual connection and fallback modes, thereby provoking an immediate response from the cellular device.

20 Claims, 12 Drawing Sheets

METHODS AND APPARATUS FOR VIRTUALLY CONNECTED COMMUNICATION MODES

PRIORITY

This application claims priority to U.S. Provisional Patent Application Ser. No. 61/240,912 filed Sep. 9, 2009 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for correcting a loss of state machine synchronization between devices operating in a virtually connected communication mode.

2. Description of Related Technology

Paging mechanisms are used in many prior art wireless radio communication systems. Paging mechanisms allow a wireless device to minimize power consumption by operating in a reduced or "idle" state while unused. Once a wireless device receives a paging notification, it "wakes up" to respond. For example, Universal Mobile Telecommunications System (UNITS) is one exemplary implementation of a "third-generation" or "3G" cellular telephone technology. UMTS user equipments (UEs) support a variety of paging procedures to allow various network entities paging access to the UE.

The multiple paging procedures available to a UMTS UE are generally implemented within a state machine. As discussed in greater detail below with respect to FIGS. 1 and 2, the finite state machine (FSM) is implemented such that a cellular device operating in "idle" mode is inactive. An idle cellular device only periodically checks for "wake up" messages (e.g., paging notifications), or to transmit/receive a periodic device update. A cellular device operating in a connected state has a dedicated connection to the radio access network, and may actively send and receive data, while maintaining the radio connection.

When a cellular phone transitions its state, the UE and BS (base station) or RNC (Radio Network Controller) must initiate a connection which takes significant time and signaling overhead (the UE is unknown to the network, and must establish a connection via procedures for authentication, authorization, registration, etc.). Once connected, the UE may perform a myriad of data and/or control transactions with the network. The UE is assigned a temporary identifier, which allows the UE to be paged and resume the context of its previous operations; i.e., without re-establishing a connection.

Virtual connections may also be established, which enable a UE to remain, for the most part, relatively unencumbered by the processing and radio network management burdens of maintaining a radio connection. However, since the UE retains its temporary identifier, the UE can be quickly paged if necessary.

Unlike normal connectivity, virtual connectivity does not have a dedicated connection, and the UE can move into and out of cellular coverage, unnoticed by either the serving BS (or RNC) and the UE. Unfortunately, if a UE misses a page from the network in virtually connected operation (for example, if the UE has moved out of coverage), the network assumes the device has been dropped, or power cycled (i.e., that it has reset to an idle mode). The network switches to the legacy identity (e.g., IMSI, TMSI) for the UE. The UE, which is still operating in virtually connected mode, is oblivious to the RNCs state change. The loss of agreement on paging identification between the RNC and UE can be problematic at least.

Thus, improved methods and apparatus are needed which address the hazards related to virtual connection support. Such an improved solution should ideally operate substantially seamlessly and without adversely impacting user experience on legacy radio apparatus, and that of other wireless devices. The improved mechanisms should also robustly handle synchronization loss in virtually connected systems, while still preserving the benefits of the virtual connection.

SUMMARY OF THE INVENTION

The present invention satisfies the aforementioned needs by providing improved apparatus and methods for paging in a wireless network.

In a first aspect of the invention, a mobile apparatus is disclosed. In one embodiment, the apparatus includes: a digital processor; a wireless interface in data communication with the processor; and a storage device in data communication with the processor, the storage device comprising computer-executable instructions. When executed by the digital processor, the instructions in one variant: initialize a paging state machine, the paging state machine having at least a first and second paging states, the first and second paging states having a first and second paging identifier corresponding thereto; and receive a paging message via the wireless interface. If the paging message is received during the first paging state, and addresses the first identifier, executes a first paging response; if the paging message is received during the second paging state, and addresses the second identifier, executes a second paging response; and if the paging message is received during the first paging state, and addresses the second identifier, executes a third paging response.

In one variant, the mobile apparatus includes a UMTS (Universal Mobile Telecommunications System) UE (user equipment), the first paging state includes an URA_PCH (UMTS Terrestrial Radio Access Network (U-TRAN) Registration Area Paging Channel) state, the second paging state includes an IDLE state, the first identifier includes a U-RNTI (UTRAN Radio Network Temporary ID), and the second identifier includes a TMSI (Temporary Mobile Subscriber Identity).

In a second aspect of the invention, a base station apparatus is disclosed. In one embodiment, the apparatus includes: a digital processor; a wireless interface in data communication with the processor; and a storage device in data communication with the processor, the storage device comprising computer-executable instructions. The instructions are configured to, when executed by the digital processor, initialize a paging state machine, the paging state machine having at least a first and second paging states, the first and second paging states having a first and second paging identifier corresponding thereto. During the first paging state: the state machine transmits at least a first paging message via the wireless interface, the first paging message addressing the first identifier; responsive to receiving a first response to the first paging message, commences normal operation; and responsive to not receiving a first response to the first paging message, commences corrective operation.

In a third aspect of the invention, a method of correcting state errors is disclosed. In one embodiment, the state errors occur in a wireless system during virtually connected operation, and the method includes: identifying at least a first state and a second state, the first and second states having a first and second identifier corresponding thereto, respectively; receiving a first message, the first message including a message identifier. In one variant, if the message identifier matches the first identifier during the first state, a first response is executed; and if the message identifier matches the second identifier during the first state, a corrective response is executed, and a transition to the second state made.

In a fourth aspect of the invention, a method of detecting state errors is disclosed. In one embodiment, the state errors occur during virtually connected operation of a paging state machine, the paging state machine having at least a connected state, a virtually connected state, and an error state, and the method includes: during the virtually connected state, transmitting at least a first and second message. Responsive to receiving a first response to the first message, the connected state is transitioned to; and responsive to receiving a second response to the second message, the error state is transitioned to.

In a fifth aspect of the invention, a wireless system comprising a wireless system comprising the aforementioned mobile and base station apparatus is disclosed.

In a sixth aspect of the invention, a computer readable apparatus having a storage medium with at least one computer program disposed thereon is disclosed.

In a seventh aspect of the invention, a method of operating a mobile apparatus is disclosed.

In a sixth aspect of the invention, a method of operating a base station apparatus is disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Reference is now made to the drawings, wherein like numerals refer to like parts throughout.

Overview

In one aspect, the present invention provides methods and apparatus for operating wireless devices in a virtually connected mode, such as for the correction of paging errors. In one embodiment, a cellular network is disclosed wherein a mobile device can recover from a paging error which occurs during virtually connected operation with a base station or Radio Resource Controller. A mobile device operating in a virtually connected paging mode constantly monitors incoming paging messages for both a currently assigned temporary identifier and a "fallback" identifier. Correctly received pages are treated via existing methods; however, pages which address the mobile device but which appear to be incorrectly received or otherwise possess inconsistencies are flagged as errors. Once an error has been detected, the mobile device performs a soft reset to recover from the error, and responds normally to the received paging message. The expedited recovery of paging state mismatch significantly enhances user equipment operation, and perceived quality and user experience.

In a second embodiment, a base station operating in a virtually connected paging mode can split its paging messages, if a paging response has not been timely received. Mobile devices which have been power cycled, or otherwise reset should respond to a first page, where the first page identifies the mobile via its network identifier. Mobile devices which have simply had a momentary loss of coverage will respond to the second page, where the second page identifies the mobile via its connection-specific identifier.

DETAILED DESCRIPTION OF EXEMPLARY EMBODIMENTS

Exemplary embodiments of the present invention are now described in detail. While these embodiments are primarily discussed in the context of paging mechanisms of a UNITS wireless network, it will be recognized by those of ordinary skill that the present invention is not so limited. In fact, the various aspects of the invention are useful in any wireless network (whether cellular or otherwise) that can benefit from the robust paging mechanisms described herein including without limitation ad hoc networks and peer-to-peer wireless networks.

Paging State Machines and Paging Modes—

As previously noted, the multiple paging procedures available to a wireless device (e.g., UMTS UE) are generally implemented within a state machine. A finite state machine (FSM) (or other state machine) is composed of a finite number of "states", where each state is defined with a limited number of actions available (in the current state), and a limited number of transitions to other states (i.e., the next state). Finite state machines are used throughout the related arts to, inter alia, greatly simplify complex interactions and improve design robustness.

Figure 1:
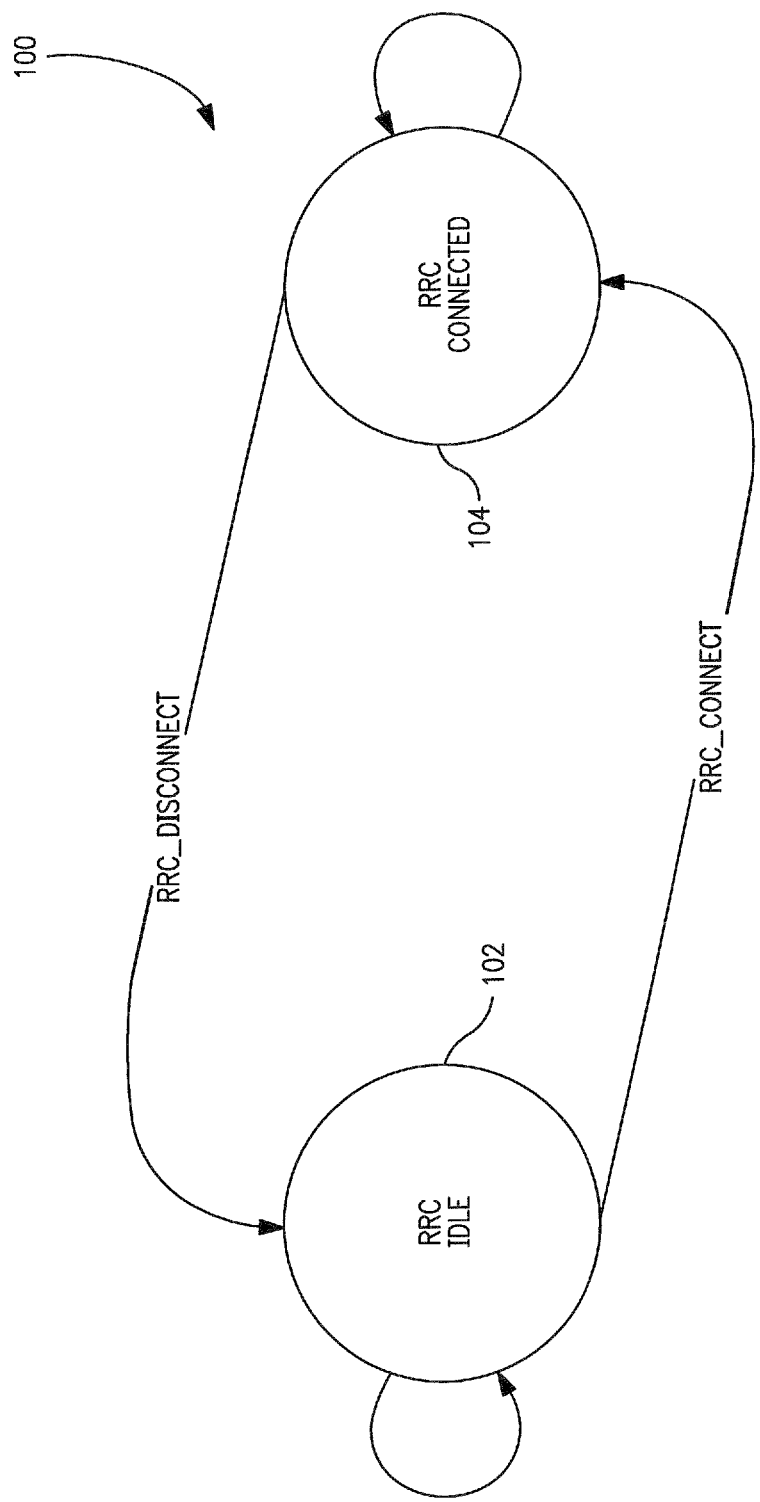
FIG. 1 is a functional block diagram illustrating a typical prior art generalized Radio Resource Control (RRC) finite state machine (FSM).

One exemplary prior art Radio Resource Control (RRC) state machine 100 is shown in FIG. 1. The exemplary RRC state machine consists of a simple RRC_IDLE state 102, and a RRC_CONNECTED 104 state. RRC_IDLE and RRC_CONNECTED each have specified actions and a specified transition path to the other state (e.g., an idle device can "connect", but a connected device cannot "connect" again). A cellular device operating in RRC_IDLE is in "sleep" mode, and inactive. An idle cellular device only periodically checks for "wake up" messages (e.g., paging notifications), or to transmit/receive a periodic device update. A cellular device operating in RRC_CONNECTED has a dedicated connection to the radio access network, and may actively send and receive data, while maintaining the radio connection.

Figure 2:
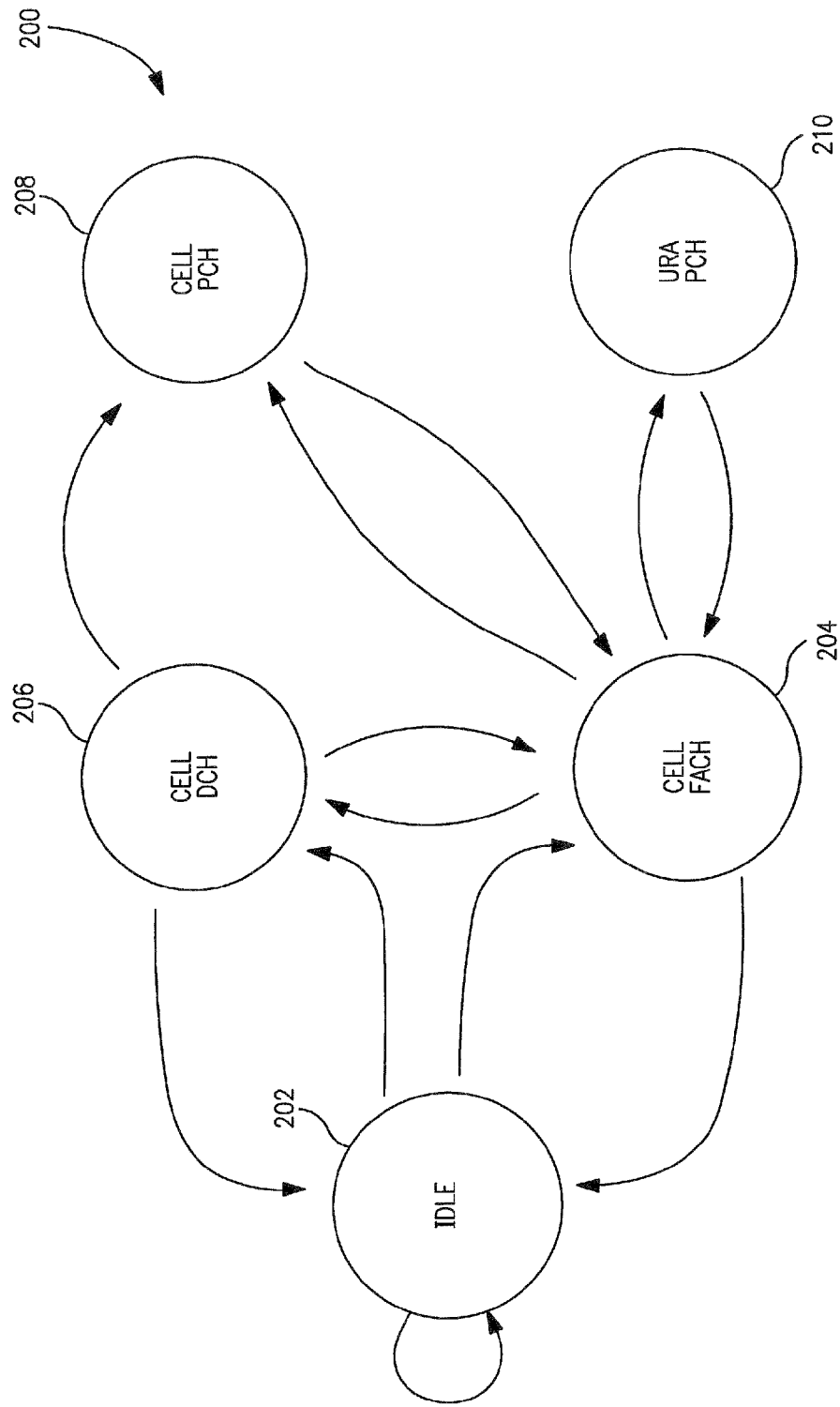
FIG. 2 is a functional block diagram illustrating a prior art UMTS specific Radio Resource Control (RRC) finite state machine (FSM).

UMTS cellular networks have further divided the RRC state machine into additional substituent states to accommodate improvements to paging channel operation. FIG. 2 illustrates one exemplary prior art UMTS paging state machine 200. The UMTS paging state machine consists of: (i) IDLE state 202, (ii) CELL_FACH state (Cell Forward Access Channel) 204, (iii) CELL_DCH state (Cell Data Channel) 206, (iv) CELL_PCH (Cell Paging Channel) state 208, and (v) URA_PCH state (U-TRAN (UMTS Terrestrial Radio Access Network) Registration Area Paging Channel) 210.

During CELL_DCH 206, the UTRAN and UE have, and actively maintain, dedicated channels (e.g., a Dedicated Packet Data Channel (DPDCH) and Dedicated Packet Control Channel (DPCCH)). In contrast, during CELL_FACH 204, the UTRAN and UE communicate only via common channels (shared among multiple UEs); CELL_FACH communications are performed via RACH (Random access channel) and FACH (Forward access channel) common channels. If a UE is relatively inactive, then the UE will transition to a "virtually" connected mode, either CELL_PCH 208, or URA_PCH 210. In CELL_PCH, the UE is known to the UTRAN within a serving cell area. In URA_PCH, the UE is known to the UTRAN within a registration area (a collection of coverage cells). The transition to CELL_PCH or URA_PCH is settled based on considerations such as mobility, frequency of use, etc. Operation of the UMTS paging states is well known, and further described in 3GPP TS 25.331: "Radio Resource Control (RRC); Protocol Specification (Release 8)" incorporated herein by reference in its entirety.

As shown in FIG. 2, during UMTS IDLE mode 202 a cellular device (UE) is not connected to the network. When a cellular phone transitions to CELL_FACH 204, or CELL_DCH 206, the UE and RNC (Radio Network Controller) must initiate a RRC connection which takes significant time and signaling overhead (the UE is unknown to the network, and must establish a connection via procedures for authentication, authorization, registration, etc.). Once connected, the UE may perform a myriad of data and/or control transactions with the network. The UE is assigned a temporary identifier (UTRAN Radio Network Temporary ID (U-RNTI)), which allows the UE to be paged and resume the context of its previous operations; i.e., without re-establishing a connection.

As previously mentioned, once a UE has successfully connected to the Radio Access Network (RAN) (i.e., either via CELL_FACH 204, or CELL_DCH 206), the UE may wish to remain connected to the network, but without the commitment of any radio resources. Consequently, UMTS provides "virtual" connection modes CELL_PCH 208, and URA_PCH 210. Virtual connections enable a UE to remain, for the most part, relatively unencumbered by the processing and radio network management burdens of maintaining a radio connection. However, since the UE retains its U-RNTI, the UE can be quickly paged if necessary.

Unlike normal RRC based connectivity (e.g., CETTFACH 204, CELL_DCH 206), virtual connectivity does not have a dedicated radio resource for connection, and the UE can move into and out of cellular coverage, unnoticed by either the serving RNC and the UE. Unfortunately, if a UE misses a page from the network in virtually connected operation (for example, if the UE has moved out of coverage), the network assumes the device has been dropped, or power cycled (i.e., that it has reset to IDLE mode 202). The network switches to the legacy identity (e.g., IMST, TMSI) for the UE. The UE, which is still operating in virtually connected mode, is oblivious to the RNCs state change. The loss of agreement on paging identification between the RNC and UE can be problematic at least.

For example, if the UE is in URA_PCH 210, but the BS expects the UE to be in IDLE 202, then the UE only monitors for paging messages with the U-RNTI identifier, while the RNC only sends paging messages using the TMSI identifier. The discrepancy in internal state machines will not be resolved until the UE attempts another re-registration (e.g., after a timeout, a location update, a power cycle, etc.). This "blackout" period may last a few hours, during which the UE is effectively out of service.

Thus, the methods and apparatus of the present invention address the hazards related to virtual connection support. Advantageously, these methods and apparatus operate effectively seamlessly, and without adversely impacting user experience on legacy radio apparatus (and that of other wireless devices). Synchronization loss in virtually connected systems is efficiently handled, while still preserving the benefits of the virtual connection.

UMTS Specific Paging Channel Implementation—

Figure 3:
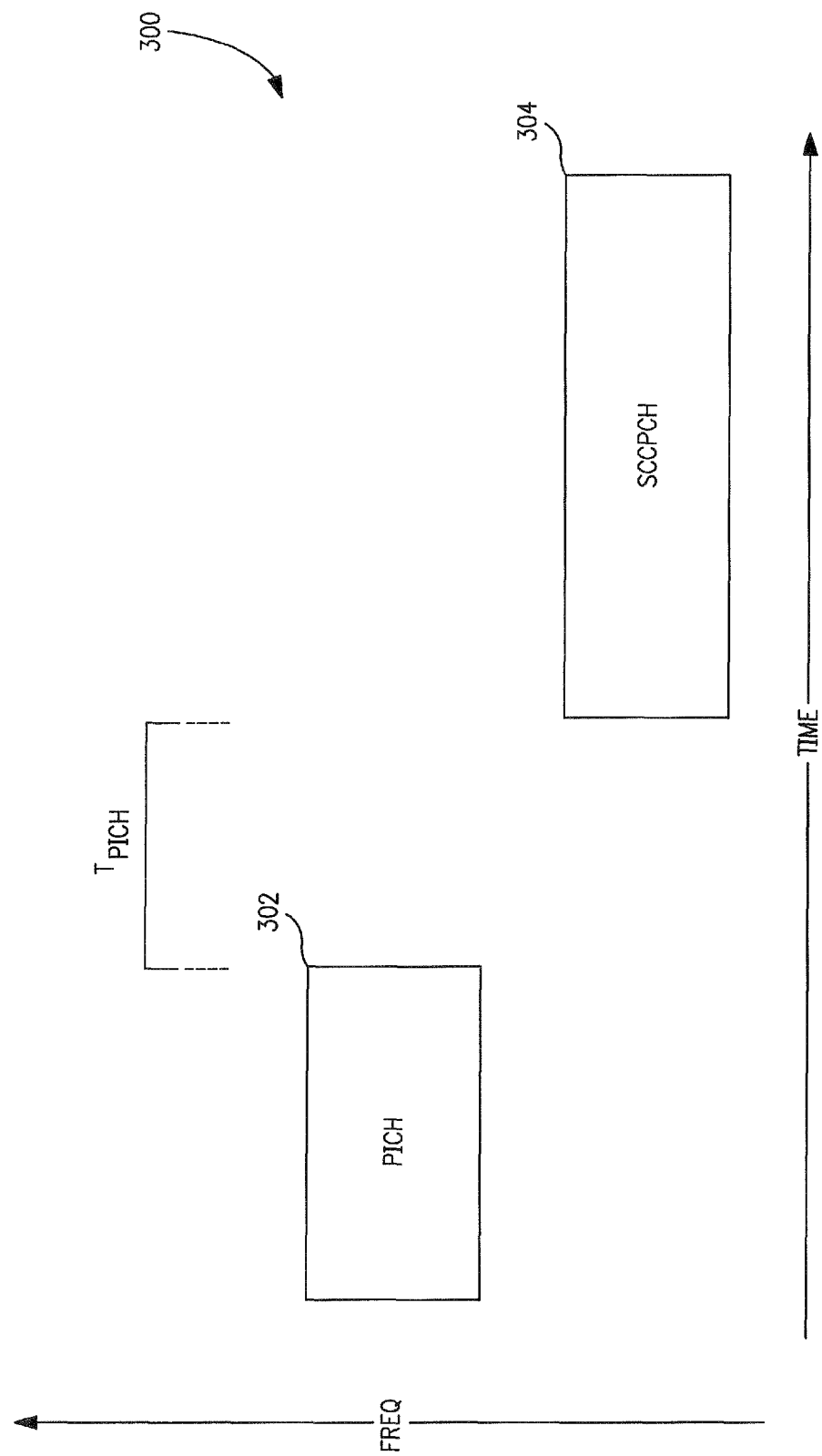
FIG. 3 is a graphical illustration of a prior art UMTS paging channel comprising a first Paging Indicator Channel (PICH), and a Secondary Common Control Physical Channel (S-CCPCH).

Within the context of the UMTS cellular network, the prior art UMTS specific paging timing 300 is illustrated in detail in FIG. 3. In connected modes such as CELL_DCH 206 and CELL_FACH 204, the UE will receive PagingType 2 messages through dedicated control channels. In virtual connected state such as CELL_PCH 208 or URA_PCH 210, the UE monitors the Paging Indicator Channel (PICH) 302 during every DRX (Discontinuous Reception) cycle, similar to IDLE 202 mode. If the network pages the UE, then a paging notification is transmitted having a pre-assigned paging identifier (e.g., TMSI, U-RNTI, etc.). The paged UE decodes the paging identifier; if the UE determines that there is a paging message, then the UE decodes the PagingType 1 message from Secondary Common Control Physical Channel 304 (S-CCPCH) which follows the PICH. The paging identifier used by the UE, and the RNC/CN depends on the current state of the RRC state machine; each entity independently tracks the RRC state (i.e., the UE has an internal state machine, and the RNC has an internal state machine, etc.).

The UE maintains several unique identifiers. One such unique identifier is the International Mobile Subscriber Identity (IMSI), which is unique throughout the entire cellular network. The IMSI is identifiable, and may be tracked by eavesdroppers on the radio interface. Due to the sensitive nature of the IMSI, it is rarely transmitted by the phone to the network.

To protect the IMSI, a randomly generated TMSI (Temporary Mobile Subscriber Identity) is assigned to the subscriber by the Core Network immediately after a successful registration, and used thereafter. The TMSI is randomly assigned by the Core Network the number is specific to a location area, and is updated each time the mobile moves to a new geographic area. The Core Network frequently changes the TMSI of the mobile to prevent a malicious eavesdropper from identifying the subscriber on the radio interface.

Referring back to the exemplary UMTS paging state machine of FIG. 2, during IDLE mode 202, the UE is unconnected to the cellular network and must be paged with the TMST. The TMSI has both geographic and temporal limitations to validity, but these limitations are fairly loose. For example, a user which moves out of coverage temporarily will have the same TMSI and need not retransmit its IMSI.

Once a UE has established a radio connection (e.g., CELL_DCH 206, or CELL_FACH 204), the RNC assigns a Serving Radio Network Temporary Identifier (S-RNTI). The SRNC (Serving Radio Network Controller) identification combined with S-RNTI is a unique identifier of the RRC connection throughout the entire network. The combination of SRNC identifier and S-RNTI is generally referred to as the U-RNTI (UTRAN Radio Network Temporary Identifier). After establishing a U-RNTI, the UE may opt to continue processing with its radio connection, or it may transition to a "virtually" connected mode (e.g., either CELL_PCH 208, or URA_PCH 210).

Unlike a TMSI identity which specifies a subscriber, the U-RNTI identity is specific to a connection. Thus, the U-RNTI has an associated context between the UE and the RNC (in addition to identification). During any of the connected modes (i.e., CELL_PCH 208, URA_PCH 210, CELL_FACH 204, CELL_DCH 202, etc.), the UE is paged with the U-RNTI. The U-RNTI is unique to the UE, and is randomly generated by RNC. During IDLE mode 202, the UE can only be paged with the TMSI.

Cellular Network Architecture—

Figure 4:
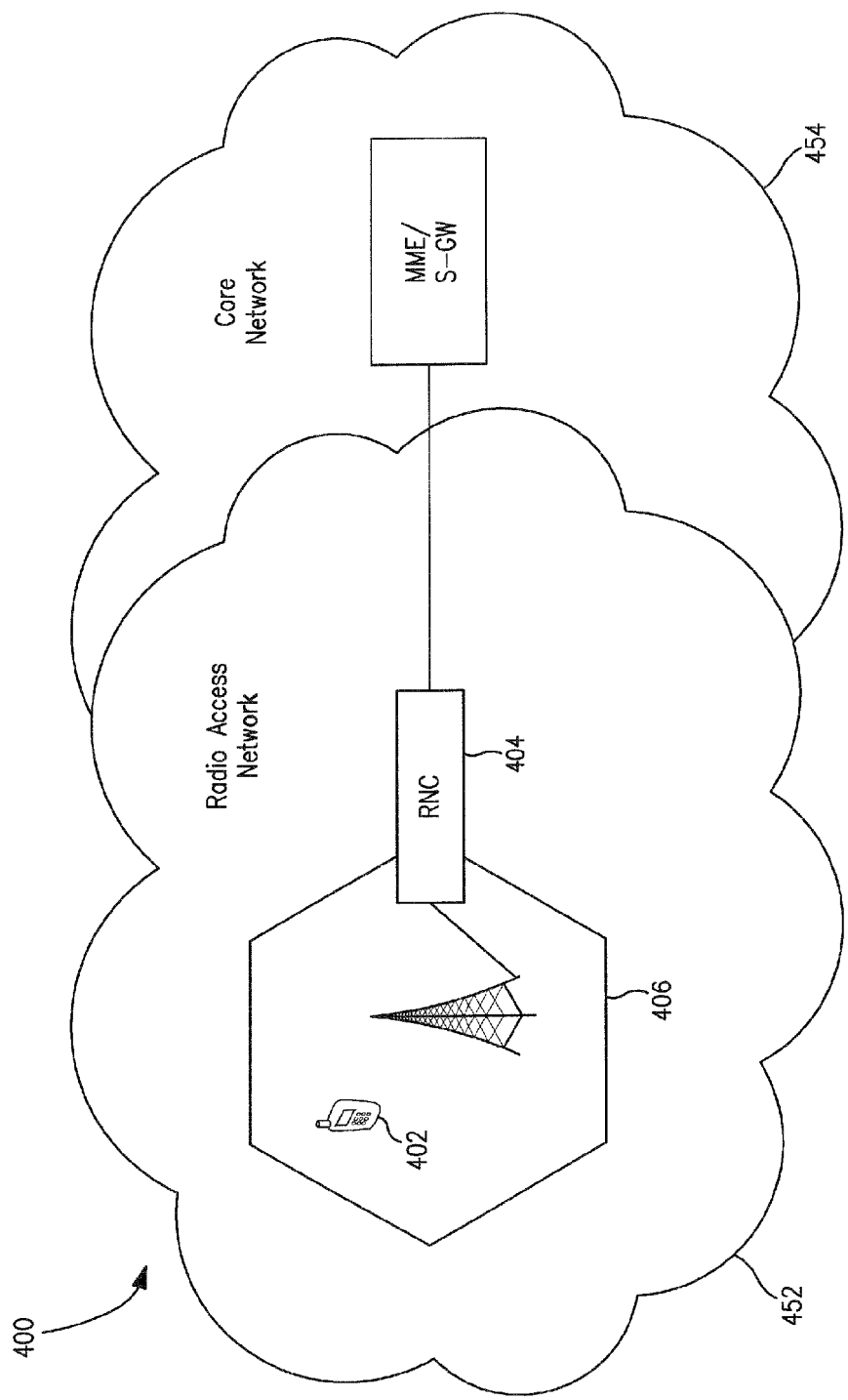
FIG. 4 is a graphical illustration of UMTS network comprising a Core Network, and an UMTS Terrestrial Radio Access Network (UTRAN), useful with one embodiment of the present invention.

FIG. 4 illustrates one exemplary cellular network 400 useful with various embodiments of the invention. A cellular radio system includes a network of base stations 404 or cell sites, each of which provides radio coverage within a "cell" 406. The network of cells is managed by a network operator. The network operator provides, among other things, routing of calls and data throughout the base station network, as well as authentication, authorization, and accounting information for each of a plurality of subscribers. Cellular network subscribers may transmit and receive calls and data via the cellular network after connecting to the network.

The UMTS Radio Network Controller 404 is commonly referred to as "RNC". The network of RNC is termed the UMTS Terrestrial Radio Access Network (UTRAN) 452. A UMTS subscriber operates User Equipment (UE) 402 to send and receive calls and data. The network operator controls UE access via a Core Network (CN) 454. The Core Network includes a complex infrastructure including Authentication Centers (AuC), Gateways (e.g., SGSN, GGSN, etc.), Switches (MSC), Location Registers (Home Location Register (HLR), Visitor Location Registers (VLR)), etc. The Core Network governs user access to the cellular network.

In typical cellular network operation, the subscriber may connect only after the successful completion of authentication, authorization, registration, etc. However, this is not a requirement for the practice of the present invention. Other wireless systems which provide simpler methods for connection may similarly benefit from the invention. For example, an ad hoc network (e.g., Wi-Fi) may authenticate a wireless device using any of a number of well known encryption methods (e.g., Wireless Application Protocol (WAP), Wi-Fi Protected Access (WPA), etc.). Once successfully authenticated, the ad hoc devices may maintain a semi-permanent connection between one another. On a larger scale, a user within a Metropolitan Area Network (MAN), may connect once, and thereafter maintain a semi-permanent connection.

Similarly, within cellular technologies, such as Long Term Evolution (LTE) and LTE-Advanced (LTE-A), a cellular subscriber may receive "subscription-less" network access i.e., where the cellular network provides service to a user with at least some degree of anonymity and requiring reduced access control, or no access control.

As described in greater detail herein, the subscriber uses multiple paging modes within the UMTS cellular network; however a unified networking technology is also not required to practice the invention. Given the steady convergence of multiple wireless standards, it is appreciated that in the future, a user identity may have multiple wireless identities associated therewith. For example, a user may have a single identity which is tied to both a temporary Wi-Fi access point, and a cellular subscriber identity. Thus, in one envisioned embodiment of the present invention, both Wi-Fi and cellular paging techniques may be used to page the user.

EXAMPLE OPERATION—

Examples of operation of the improved paging mode functionality of the invention are now described in detail. While the following discussions are described with reference to Mealy-type state machines (i.e., the next state based on the current state and inputs), it will be recognized that other mechanisms for flow control are equally suitable. Such mechanisms may include for example alternative state machines types (e.g., Moore-type state machines, etc.), decision tables, sequential logic, decision trees, etc.

As previously stated, unlike normal connectivity (e.g., CELL_FACH 204, CELL_DCH 206), virtual connectivity is prone to unnoticed corruption of identifier/state agreement between the UE 402 and the RNC/CN 404. Accordingly, in one embodiment of the present invention, the UE monitors for messages (e.g., a paging message) having an identifier corresponding to both its current state (e.g., URA_PCH 210, CELL_PCH 208), and a second "fallback" state (e.g., IDLE 202). In another embodiment, the RNC transmits messaging having identifiers corresponding to both its current state, and a second previous state.

As used herein, the term "paging" refers to the broader acts of alerting or notifying a recipient device ("paged" device) of pending service or events, from a transmitting device ("paging" device).

In one example scenario, a RNC 404 (the "paging" device) and UE 402 (the "paged" device) are both operating in a virtually connected URA_PCH 210 states (each entity maintains their state, individually). The UE wanders into an area of relatively intermittent coverage (e.g., a canyon). The RNC transmits a first paging message, where the first paging message is identified with the UE's U-RNTI temporary identification. The UE misses the first paging message entirely, and remains in its URA_PCH state. The RNC assumes that the UE has been dropped, or has otherwise been reset. Responsively, the RNC transitions to IDLE 202.

Multiple Paged Identities—

In the first illustrative scenario, a UE 402 monitors multiple paging identities, in this case, a fallback paging identifier and an assigned paging identifier, to robustly handle mismatches in state between the UE and RNC/CN 404. The UE receives paging messages, and determines first if the message is addressed with a U-RNTI, or a TMSI. If the message contains a U-RNTI, the UE determines if the U-RNTI matches its own U-RNTI. If the page is addressed to the UE, then the UE responds to the page. If the U-RNTI does not match, then the page is disregarded.

However, if the message contains a TMSI instead of a U-RNTI, the UE 402 determines if the TMSI matches its own TMSI. If the page is addressed to the UE, then the UE has identified a state error. The UE pre-empts (i.e., interrupts) its own state machine and responds to the IDLE mode 202 page. TMSI pages which do not address the UE are disregarded.

Forked Paging—

In the second illustrative scenario, a missed page triggers the RNC 404 to fork the paging message, thereby resolving potential mismatches in state between the UE 402 and UTRAN/CN. The forked paging messages contain the U-RNTI identifier (the RNC maintains the previous assigned U-RNTI for the UE) and the TMSI identifier respectively; e.g., the first paging message uses the UE's TMSI, and the second paging message uses the UE's U-RNTI.

If the UE 402 responds to the TMSI page, then the RNC 404 continues with typical re-connection operation. Alternately, if the UE responds to the U-RNTI, then the RNC has identified a state error. The RNC may flag the error to the UE (triggering the UE to re-enter IDLE 202), or the RNC may resume the previous state, URA-PCH 210, and (using the previous context information) transition to CELL_FACH 204.

Methods—

Figure 5:
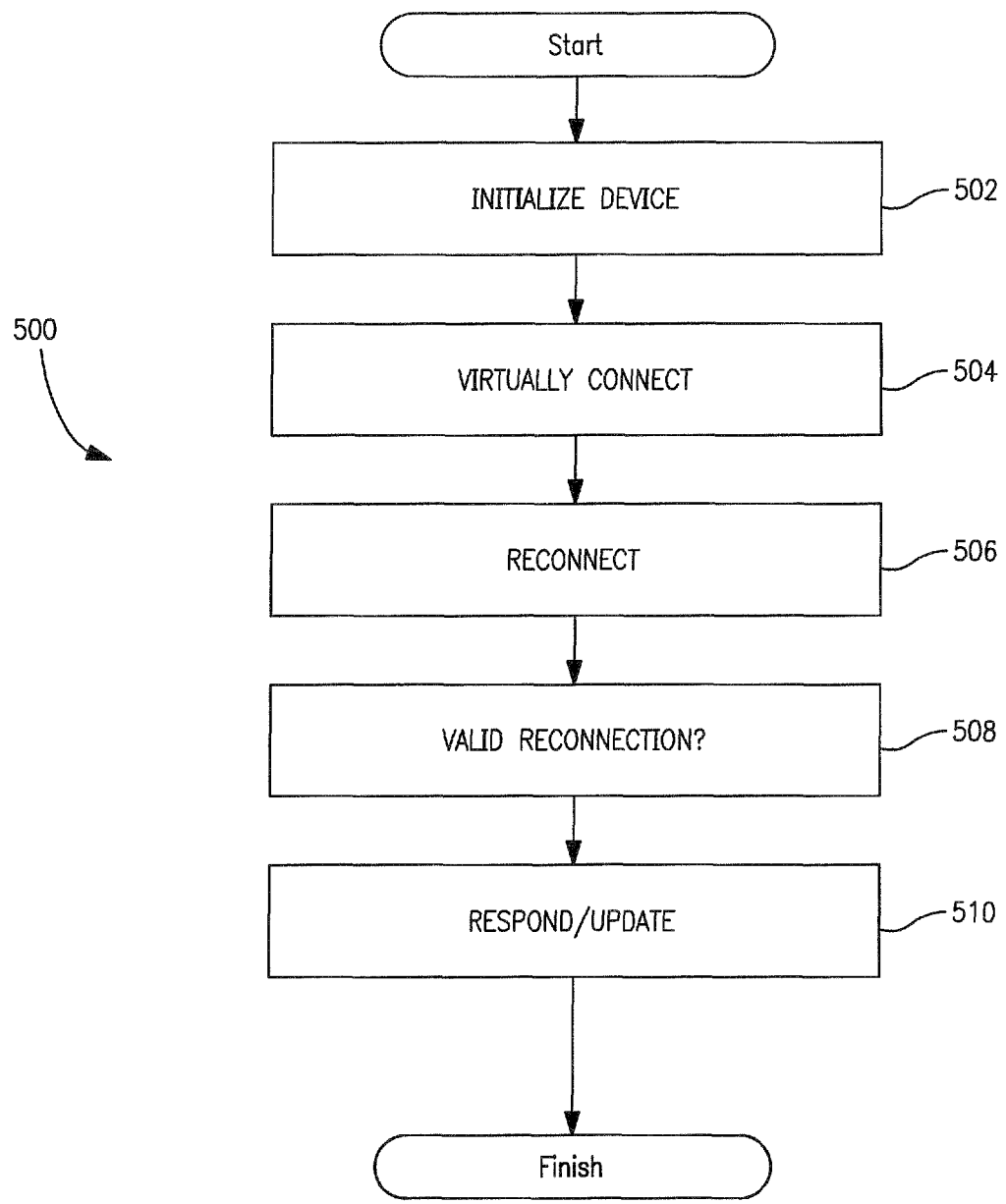
FIG. 5 is a logical flow diagram of one embodiment of the generalized process for monitoring multiple paging identifiers, in accordance with the present invention.
Figure 6:
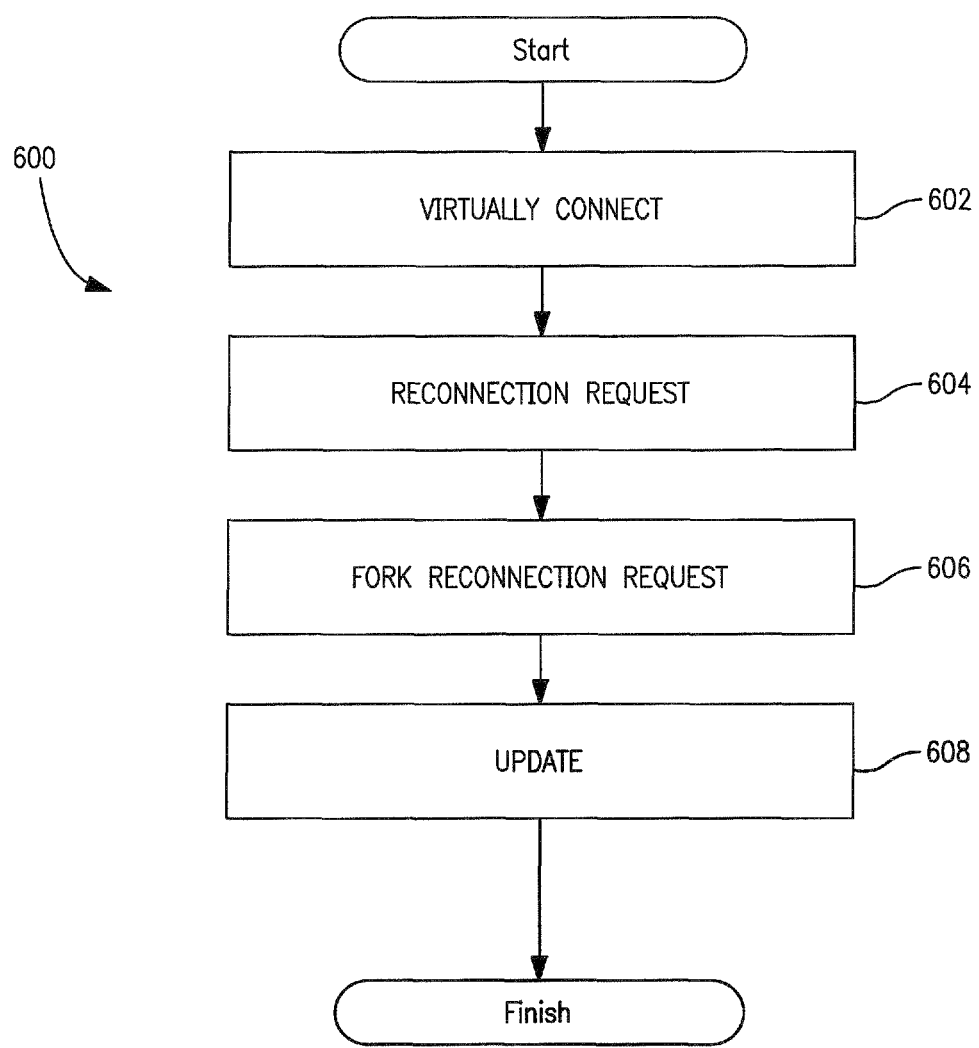
FIG. 6 is a logical flow diagram of one embodiment of the generalized process for forking paging messages, in accordance with the present invention.
Figure 6A:
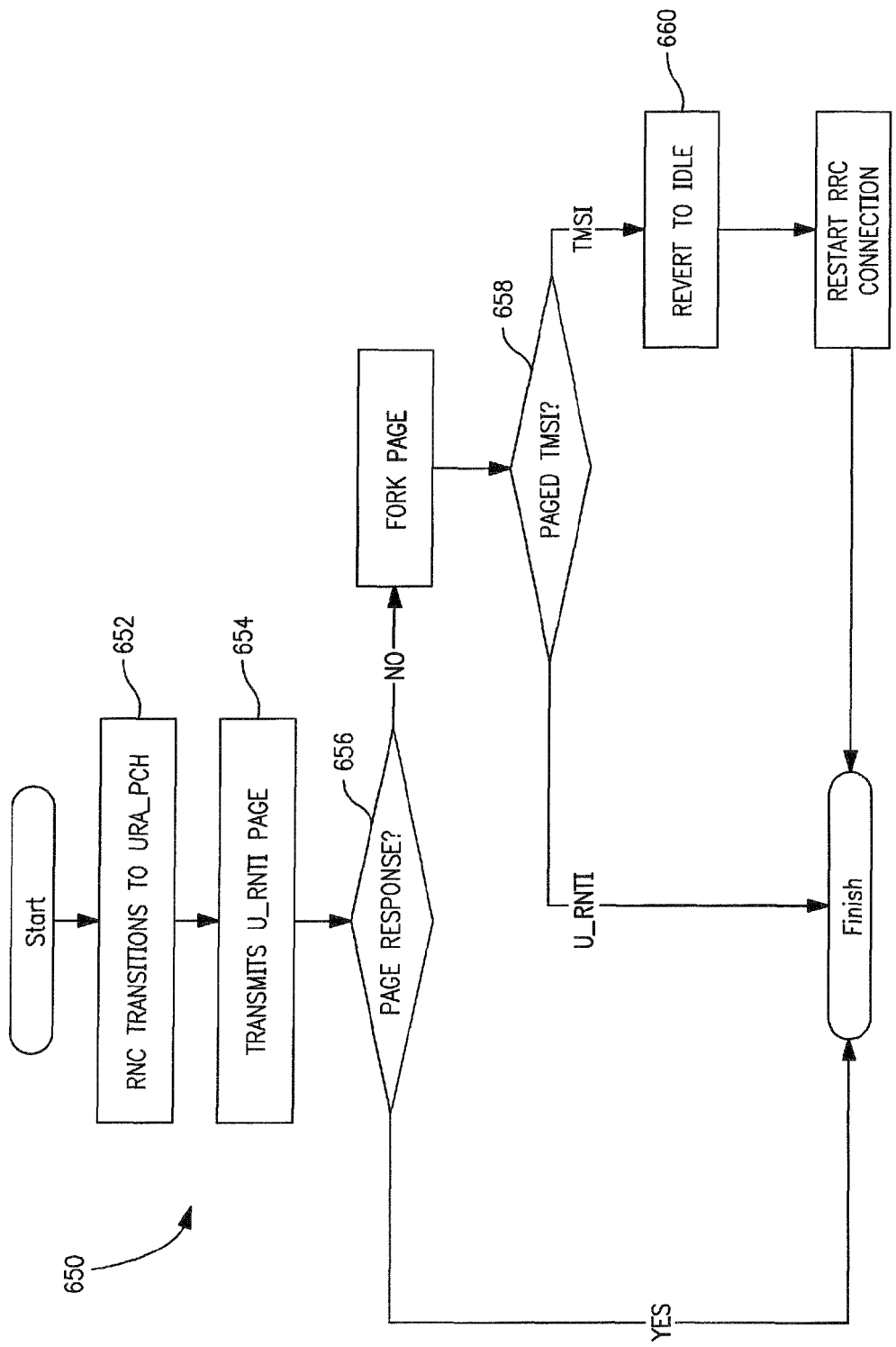
FIG. 6A is a logical flow diagram showing one specific implementation of the method of FIG. 6, in the context of a UMTS cellular system.

Referring now to FIGS. 5 through 6A, exemplary embodiments of methods for handling missed status changes in a virtually connected mode according to the invention are described. The following methods refer to a first device which is virtually connected to a second device. Thereafter, the first device attempts to reconnect to the second device.

In one exemplary embodiment, the first device is a "paging" RNC device 404 and the second device is a "paged" UE device 402. In this embodiment, The RNC and UE have a master-client relationship. Thus, a RNC controls all radio resources and operation of the cell. However, recent advancements in base station technology have proposed use of unlicensed spectrum, multiple radio links, and/or fragmented spectrum (see, e.g., 3GPP TS 36.913, entitled "*Requirements for further advancements for E-UTRA (LTE-Advanced)*" which is incorporated herein by reference in its entirety. In response to the rapidly increasing complexity of RNC or base station operation and radio connectivity, the following disclosed paging mechanisms may be readily modified if desired to support unlicensed spectrum, multiple radio links, fragmented spectrum, etc.

Similarly, alternative wireless systems, such as ad hoc or peer-to-peer networks (e.g., Bluetooth, Wi-Fi, etc.), must flexibly deal with non-standard radio resources for notification and alerting. Accordingly, such technologies may also similarly benefit from "paging" state recovery.

The following discussion describes two processes for failed reconnection recovery. Each of the following methods has benefits readily appreciated by those skilled in the arts given this disclosure. For example, the generalized method for monitoring failed reconnection (FIG. 5) is simple and inexpensive to implement within a population of mixed devices (i.e., invention-enabled and legacy devices). In contrast, forked reconnection operation (FIG. 6) minimizes the amount of radio resources consumed for device control (e.g., no re-registration process required, etc.), improving overall network resource utilization. In certain system implementations, both techniques may be used in concert with one another, thereby conveying the advantages of both methods of correction.

Monitoring Failed Reconnection—

FIG. 5 illustrates one embodiment of a generalized method 500 for monitoring for a failed reconnection attempt in a virtually connected mode.

At step 502, a second device is initialized for a virtually connected mode by a first device. In one embodiment, the second device has multiple identifiers. In one variant, the identifiers include at least a "fallback" identifier, and an assigned identifier. The assigned identifier is a temporary identifier assigned by the first device. Furthermore, the fallback identifier and the assigned identifier may be recognizably different in format. In one UMTS-specific embodiment, a RNC 404 assigns a UE 402 a temporary U-RNTI for connected operations (e.g., CELL_PCH 208, URA_PCH 210, CELL_DCH 206, CELL_FACH 204). The UE maintains a TMSI/IMSI with the Core Network for paging mode operation during IDLE 202 mode.

In another embodiment, the first and second devices share multiple radio links. For example, the first device assigns the second device multiple identifiers, each of the identifiers corresponding to a radio link.

In another embodiment, the first and second devices are peer devices. Thus, the first device is initialized for a virtually connected mode by the second device as well.

In yet another embodiment, the second device has a first identifier, and a second identifier, where the first and second identifiers are associated with different radio resources. Such radio resources may include time slots, frequency bands, code domains, etc.

At step 504, the second device enters a virtually connected mode. The second device may request a transition to the virtually connected mode, or alternatively may be assigned to the virtually connected mode by the first device. In one embodiment, entry of the second device into virtually connected operation relinquishes the second device's assigned radio resource. In yet another embodiment, entry of the second device into virtually connected operation substantially reduces overhead for either the first or second device (e.g., processing burden, radio resource, etc.). In still another embodiment, upon entry of the second device into virtually connected operation, the second device may operate using substantially less power.

A network optimization algorithm or "engine" optionally resident within either the first or second device can be configured to take into account the management and radio resource overhead associated with maintaining a radio connection, or a virtual connection. Accordingly, the exemplary network optimization engine can modify the paging behaviors of the system to reduce, or optimize for any of a number of considerations (e.g., processing burden, radio resource, etc.).

At step 506, the first device transmits a reconnection request to the second device. The reconnection request contains at least one addressee identifier, where the addressee identifier corresponds to the mode of operation of the first device. Alternatively, during virtually connected operation, the second device periodically checks a radio resource for broadcasted reconnection messages. When the second device is not checking for reconnection messages, it is free to perform other tasks unrelated to radio operation (e.g., media processing, sleep mode functions, peripherals processing, etc.). In one variant, the radio resource being checked is a paging channel, where the paging channel is designated in time, frequency, code, or any combination thereof. For example, in one UMTS-specific implementation, a UE 402 checks a Paging Indication Channel (PICH) 302, which is broadcast at the start of each DRX cycle. In alternative implementations, the second device is periodically or continuously checking for reconnection messages.

In yet another configuration, during virtually connected operation, the second device is signaled with a low-complexity reconnection message. The low-complexity reconnection message indicates e.g., one or more pending messages containing the addressee identifier.

At step 508, the second device determines if the reconnection message is valid within at least one mode of operation. The reconnection message contains at least one addressee identifier (as previously noted with respect to step 506). In one embodiment, the second device compares the addressee identifier with the previously initialized multiple identifiers. For example, the second device may compare the addressee identifier to at least the fallback identifier, and the assigned identifier.

If the addressee identifier matches any of the second device's multiple identifiers, then the second device determines if the addressee identifier indicates an identifier disagreement between the first and second devices. If the reconnection message is addressed for the second device, but the first device's mode does not match the second device's expected mode, then an error has occurred. In one such variant, the mode disagreement corresponds to the states of the state machines of the first and second device.

In another such variant, the mode disagreement corresponds to mismatched radio links selected from multiple supported radio links.

In yet another such variant, the mode disagreement corresponds to differing radio resources. For example, if a UMTS UE 402 receives a paging message addressed to a U-RNTI during its URA_PCH 210 state, then the UE and the RNC 404 are in agreement on their current state. Accordingly, the UE compares its internal U-RNTI to the received U-RNTI to determine if the paging message is addressed to the UE. Conversely, if the UE receives a paging message addressed to its TMSI while it is in the URA_PCH state (i.e., expecting a U-RNTI), then the UE has identified a mismatch.

At step 510, the second device responds and updates its internal status if necessary. In one embodiment, updating of the internal status is performed by interrupting the second device's current mode of operation. For example, the second device may preempt its own internal state machine. Preemption as used in the present context refers to interruption of a state machine's normal operation, with operation in a preferred state. In one such variant, the preferred state is "reset" or fallback state.

Alternatively, the preferred state may be an error correction or remedial state. Such error correction states may additionally execute operations including error logging, state correction, and/or error notification.

In one embodiment, the second device resets its internal state to the fallback state, and responds to the reconnection message. For example, in the aforementioned UMTS scenario, the UE 402 may simply reset its state machine to state IDLE 202, and respond to the paging message. The UE re-establishes a connection to the RNC/CN. Thus, the UE must repeat authentication, authorization, registration, etc.

Alternatively, the second device may respond within the fallback state, and additionally provide error correction information to the first device. In response to the error notification, the first device and second device may resume the previous state, obviating the steps for connection re-establishment. The error correction information may additionally contain the previously used temporary identifier, information useful for verifying the second device's identity, e.g., an encrypted copy of its IMSI, a digital signature, etc.

Similarly, in another embodiment, the second device can respond in its current state, thereby requiring the first device to resume corrective action. The second device may for example provide error correction information and/or verification information to the first device to facilitate resumption of state.

Figure 5A:
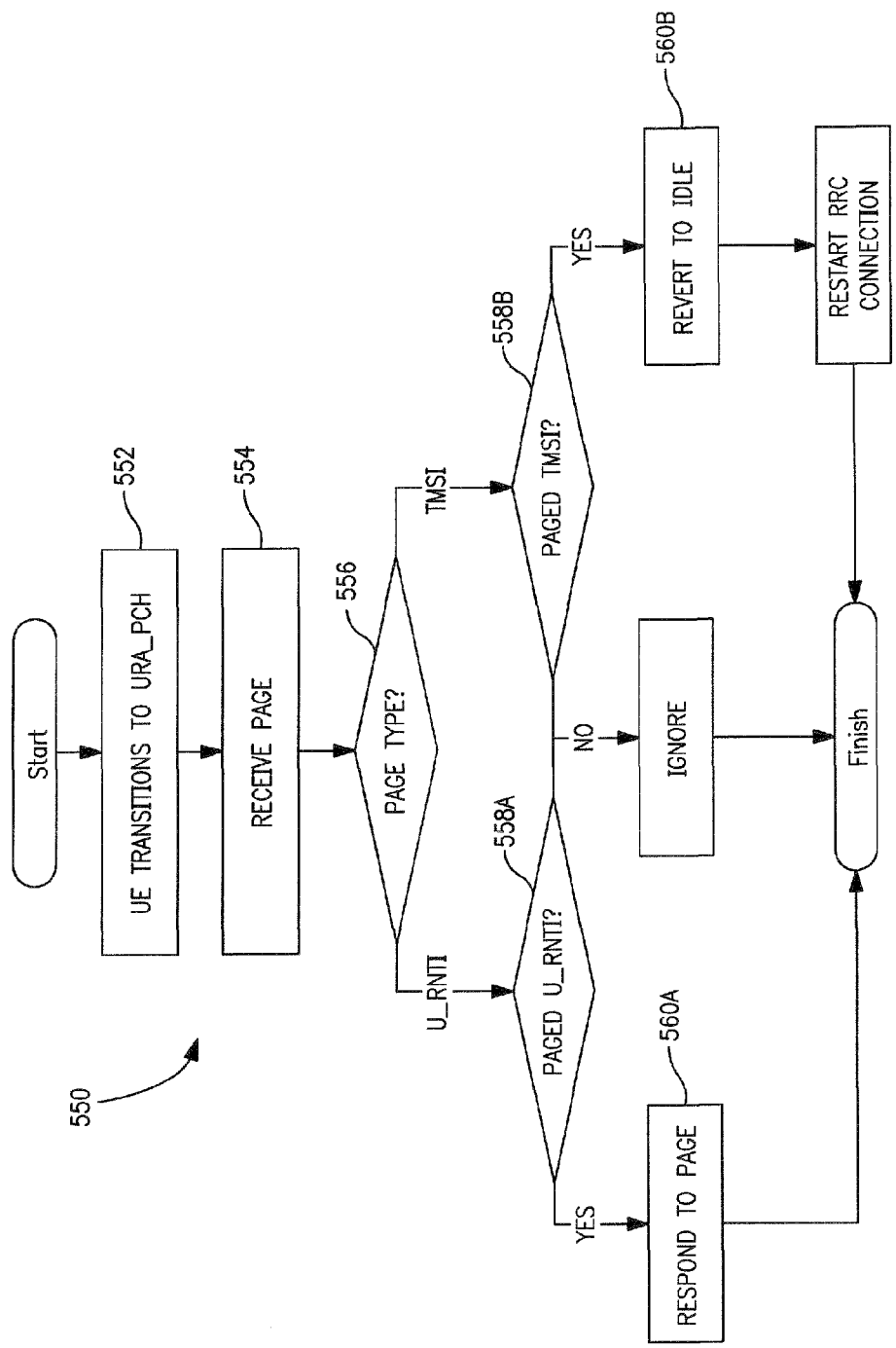
FIG. 5A is a logical flow diagram showing one specific implementation of the method of FIG. 5, in the context of a UMTS cellular system.

FIG. 5A illustrates one exemplary implementation 550 of the generalized method of FIG. 5. At step 552, the UE transitions into URA_PCH 210. At step 554, the UE receives a page message. At step 556, the UE determines the paging message type. If the paging message has a U_RNTI (558A), then the UE determines if the U_RNTI matches its own U_RNTI, and responds accordingly (560A). If the paging message has a TMSI (558B) and the TMSI matches its own TMSI, then the UE fall backs to IDLE 202 and restarts a new RRC connection (560B).

Forked Reconnection—

FIG. 6 illustrates one embodiment of a generalized method 600 for forking a reconnection request. As previously noted, while the following discussion of the forked reconnection method 600 is generally complementary to the method for monitoring failed reconnections 500, it will be appreciated that both processes may be executed independently of, or in tandem with, the other.

At step 602, the second device is placed into a virtually connected mode. As previously described in the monitoring method 500, in one embodiment, the second device has multiple identifiers; e.g., a fallback identifier and an assigned identifier. The assigned identifier may be a temporary identifier assigned by the first device, and the fallback identifier is assigned to the second device and provided to the first device, such by a network authority or administrator. In one UMTS specific embodiment, a RNC 404 assigns a UE 402 a temporary U-RNTI for connected operations (e.g., CELL_PCH 208, URA_PCH 210, CELL_DCH 206, CELL_FACH 204). The UE's TMSI/IMSI is provided by the Core Network to the RNC, for use during IDLE mode 202.

The second device may also request the transition to the virtually connected mode. For example, a UMTS UE 402 that has successfully registered may opt to transition to CELL_PCH 208 or URA_PCH 210 operation to conserve battery power.

In alternate embodiments, the first device assigns the second device to a virtually connected mode. For example, a UMTS RNC 404 servicing a UE 402 may assign the UE to a dormant state if the UE is expected to remain relatively inactive. Similarly, a RNC may assign the UE to a lower priority service level (virtually connected operation).

The first device additionally stores parameters relating to the second device. In one variant, the parameters may be useful for resumption of service. For example, the first device may receive parameters such as neighboring cell IDs, and their strengths (i.e., indicating the proximity of to a cell boundary, approximate geographic position, etc.). In another variant, the parameters may be useful for detecting a loss of virtual connection. For example, the first device may note information regarding the timing of future device updates (e.g., location updates). In yet another variant, the parameters may include multiple possible identifiers for the second device. Moreover, such a listing of possible identifiers may include a prioritization scheme or hierarchy, and/or implementation rules or limitations.

At a later point, the first device attempts to reconnect with the second device, such as to provision a data service, forward a call, modify network information, etc. Thus, at step 604, the first device transmits a reconnection message to the second device based on its internal mode of operation, where the reconnection message should cause resumption of the previous connection. Assuming that the first and second devices are in agreement as to the current mode of operation, then the second device should respond. Thus, if a response is received, connection operation proceeds normally (i.e., the forked method 600 is aborted).

However, if no response is returned, then at step 606, the first device splits or "forks" the reconnection message in accordance with the previously defined multiple identifiers. In one embodiment, the multiple identifiers include: (i) an assigned identifier, and (ii) a fallback identifier. Thus, the reconnection message is split or "forked" into a first assigned reconnection message identified with the assigned identifier, and a second fallback reconnection message identified with the fallback identifier.

In one implementation, the fork messages are transmitted concurrently, or substantially concurrently. For example, in each radio frame, multiple fork messages may be transmitted by a base station to a plurality of cellular devices. In one such case, during a single radio frame, each of the fork messages is transmitted by the base station. A recipient device will therefore receive the fork messages in substantially the same radio frame. Accordingly, a legacy cellular device would reply to the message which is valid for its internal state machine (i.e., fallback reconnection message). In contrast, a cellular device implementing the present invention may preferentially select the assigned reconnection message (so as to avoid re-registration, etc.).

In another embodiment, the fork messages are transmitted in an alternating or staggered fashion. A legacy cellular device would reply to the message which is currently valid for its internal state machine. In contrast, an invention-enabled cellular device may preferentially wait for the assigned reconnection message.

The fork messages may also be transmitted a set number of times, or alternatively for a designated time interval. Due to the duplication of messaging, it may be desirable for the first device to minimize the number of fork message transmissions. If the second device has not responded within a pre-defined number of retries, or set period of time, the first devices may abort the process, or alternatively, adjust its retry timing. For example, a UE 402 which has missed the initial paging messages and initial retries is most likely off, rather than out of coverage, the RNC 404 may continue to attempt contact with the UE on a considerably less frequent basis.

At step 608, if the first device receives a response, then the first device updates its internal status, and/or the second device's internal status if necessary. In one embodiment, updating of the internal status (for either first or second devices) preempts or interrupts the updated device's internal state machine. In another embodiment, updating of the internal status includes one or more corrective actions e.g., error logging, state correction, and/or error notification.

FIG. 6A illustrates one exemplary implementation 650 of the generalized method of FIG. 6. At step 652, the RNC transitions into URA_PCH 210. At step 654, the RNC transmits a page message having a U_RNTI identifier. At step 656, the RNC waits for a paging message response. If the paging response is received, then no error has occurred, and the RNC finishes the method 650. If no page response is received, then the RNC transmits forked paging messages, with both U_RNTI and TMSI identifiers. If a paging response is received with the U_RNTI, then a recoverable error has occurred, and the RNC finishes the method 650. If however, the paging response is received with a TMSI, then an unrecoverable error has occurred, and the RNC restarts the RRC connection.

Exemplary User Apparatus—

Figure 7A:
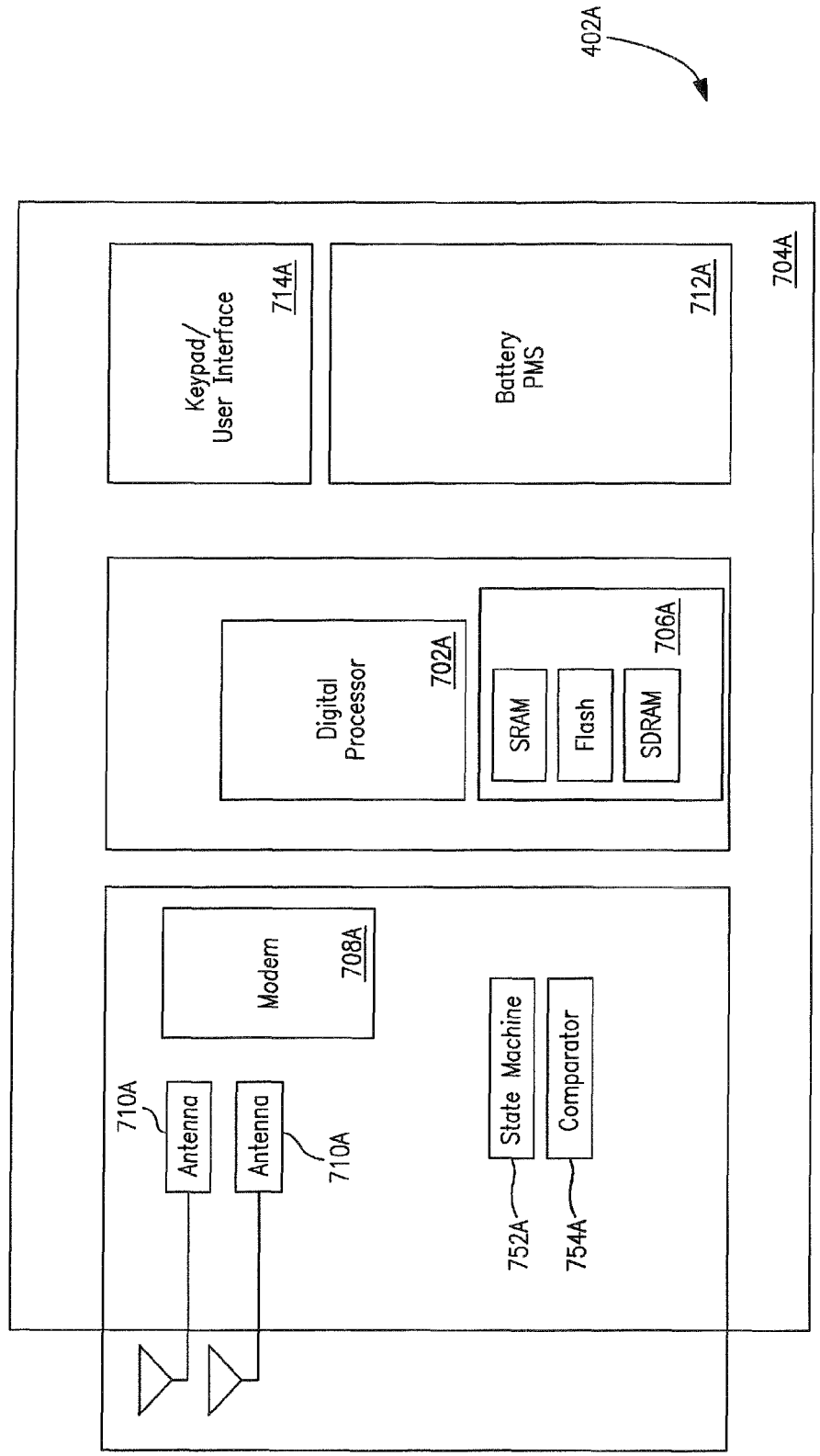
FIG. 7A is a block diagram of one embodiment of a wireless mobile cellular device apparatus configured in accordance with the present invention.

Referring now to FIG. 7A exemplary UE apparatus for implementing the methods of the present invention is illustrated. The UE apparatus 402 includes a processor subsystem 702A such as a digital signal processor, microprocessor, field-programmable gate array, or plurality of processing components mounted on one or more substrates 704A. The processing subsystem may also comprise an internal cache memory. The processing subsystem 702A is connected to a memory subsystem 706A comprising memory which may for example, comprise SRAM, flash and SDRAM components. The memory subsystem may implement one or a more of DMA type hardware, so as to facilitate data accesses as is well known in the art.

The radio/modem subsystem 708A generally includes a digital baseband, analog baseband, TX frontend and RX frontend. The apparatus 402 further includes an antenna assembly 710A; the selection component may comprise a plurality of switches for enabling various antenna operational modes, such as for specific frequency ranges, or specified time slots. In certain embodiments, some components may be obviated or may otherwise be merged with one another (such as RF RX, RF TX and ABB combined, as of the type used for 3G digital RFs) as would be appreciated by one of ordinary skill in the art given the present disclosure.

The illustrated power management subsystem (PMS) 712A provides power to the apparatus, and may comprise an integrated circuit and or a plurality of discrete electrical components. In one exemplary portable UE implementation of the apparatus, the power management subsystem 712A interfaces with a battery.

In certain embodiments of the apparatus, a user interface system 714A may be provided. A user interface may include any number of well-known 110 including, without limitation: a keypad, touch screen, LCD display, backlight, speaker, and microphone. However, it is recognized that in certain applications, one or more of these components may be obviated. For example, PCMCIA card type UE embodiments may lack a user interface (as they could piggyback onto the user interface of the device to which they are physically and/or electrically coupled).

The apparatus of FIG. 7A may further include optional additional peripherals including, without limitation, one or more GPS transceivers, or network interfaces such as IrDA ports, Bluetooth transceivers, USB, FireWire, etc. It is however recognized that these components are not necessarily required for operation of the apparatus 402 in accordance with the principles of the present invention.

In the illustrated embodiment, the processing subsystem additionally incorporates subsystems or modules for: (i) maintaining a radio connection state 752A, (ii) receiving and recognizing radio connection state messaging 754A. These subsystems may be implemented in software or hardware which is coupled to the processing subsystem. Alternatively, in another variant, the subsystems may be directly coupled to the digital baseband.

In one embodiment of the invention, the radio connection state is maintained with a radio connection state machine 752A. The radio connection state machine includes at least one connected state, and at least one virtually connected state. Typical variants will support multiple connected states, virtually connected states, and non-connected states. During operation, the current radio connection state dictates appropriate operation for the modem (e.g., via modem operation subsystem), thereby ensuring coordinated operation between the apparatus 402 and another device.

The radio connection state subsystem maintains synchronization with a complementary state subsystem within another device, via one or more radio updates using a comparator 754A. In one embodiment, the one or more radio updates are addressed with/to one or more identifiers, where the identifiers are valid for (and correspond to), one or more states of the radio connection state subsystem. The comparator compares the identifiers received from a complementary device, to the identifiers of the radio connection state subsystem, if the compared identifiers match, the radio state subsystem is updated in accordance with the content of the receive message.

The radio connection state subsystem may also be made capable of external modification based at least in part on one or more updating subsystem. In one embodiment, the updating subsystem may preempt, or override the radio connection state subsystem based on one or more received messages, where the received message includes information contrary to expected information.

Exemplary Base Station Apparatus—

Figure 7B:
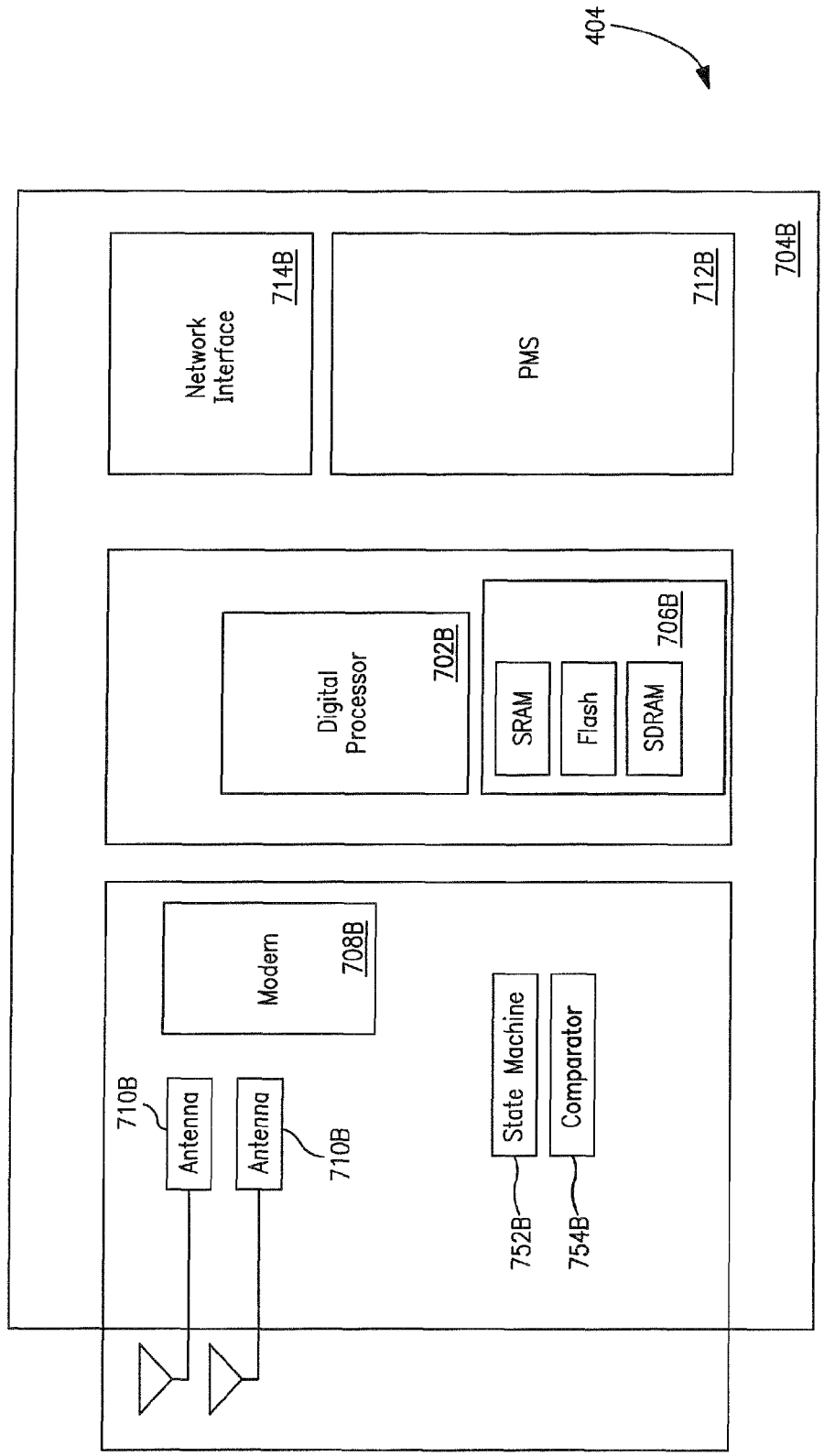
FIG. 7B is a block diagram of one embodiment of a wireless base station apparatus configured in accordance with the present invention.

Referring now to FIG. 7B exemplary BS apparatus for implementing the methods of the present invention is illustrated. The BS apparatus 404 includes a processor subsystem 702B such as a digital signal processor, microprocessor, field-programmable gate array, or plurality of processing components mounted on one or more substrates 704B. The processing subsystem may also comprise an internal cache memory. The processing subsystem 702B is connected to a memory subsystem 706B comprising memory which may for example, comprise disc drives, solid state media, or in some cases networked storage devices. The memory subsystem may implement one or a more of DMA type hardware, so as to facilitate data accesses as is well known in the art.

The radio/modem subsystem 708B generally includes a digital baseband, analog baseband, TX frontend and RX frontend. The apparatus 404 further includes an antenna assembly 710B; the selection component may comprise a plurality of switches for enabling various antenna operational modes, such as for specific frequency ranges, or specified time slots. In certain embodiments, some components may be obviated or may otherwise be merged with one another (such as RF RX, RF TX and ABB combined, as of the type used for 3G digital RFs) as would be appreciated by one of ordinary skill in the art given the present disclosure. Typical implementations of the antenna assembly 710B are multiple arrays of antennas useful for, inter alia, handling multiple simultaneous connections to multiple devices, antenna beamforming, etc.

The illustrated power management subsystem (PMS) 712B provides power to the apparatus, and may comprise an integrated circuit and or a plurality of discrete electrical components. In one exemplary BS implementation of the apparatus, the power management subsystem 712B interfaces with an external power grid, and/or generator subsystem.

In certain embodiments of the apparatus, a network interface system 714B may be provided. A network interface may include any number of well-known network connectivity and protocols including, without limitation: wired/RF cable, RF wireless, millimeter wave, optical, etc. and/or communications or networking protocols (e.g., SONET, DOCSIS, IEEE Std. 802.3, ATM, etc.).

In the illustrated embodiment, the processing subsystem additionally incorporates subsystems or modules for: (i) maintaining a radio connection state 752B, (ii) transmitting radio connection state messaging for multiple radio connection states 754B (and receiving responses). These subsystems may be implemented in software or hardware which is coupled to the processing subsystem. Alternatively, in another variant, the subsystems may be directly coupled to the digital baseband.

In one embodiment of the invention, the radio connection state is maintained with a radio connection state machine 752B. The radio connection state machine includes at least one connected state, and at least one virtually connected state. Typical variants will support multiple connected states, virtually connected states, and non-connected states. During operation, the current radio connection state dictates appropriate operation for the modem (e.g., via modem operation subsystem), thereby ensuring coordinated operation between the apparatus 404 and another device.

The radio connection state subsystem maintains synchronization with a complementary state subsystem within another device, via one or more radio updates using a forking element 754B. In one embodiment, the one or more radio updates are addressed with one or more identifiers, where the identifiers are valid for (and correspond to), one or more states of the radio connection state subsystem. The forking element generates multiple radio update messages based on both the expected state, and a "fallback" state. This process is described in greater detail hereinafter.

It will be recognized that the apparatuses of FIGS. 7A and 7B may take on any number of physical forms or configurations, depending on whether they are used as a client device (e.g., UMTS UE), a base station, or a peer device (e.g., in a peer-to-peer arrangement where the devices are substantially identical or symmetric in their capabilities). For example, more or less components and functions may be present (e.g., battery power supplies, UPS, displays, user interfaces, back-end networking interfaces, etc.), and the devices may have asymmetric or symmetric capabilities. Hence, while the following discussion of state machines is rendered in the context of an exemplary UE 402 (FIG. 8 state machine) and base station 404 (FIG. 9 state machine), this is merely illustrative of the broader principles of the invention, wherein the state machines 800, 900 may be modified, used in conjunction with one another, used in isolation, etc. based on the platform on and type of network in which they are used.

Fallback Monitoring State Machine—

Figure 8:
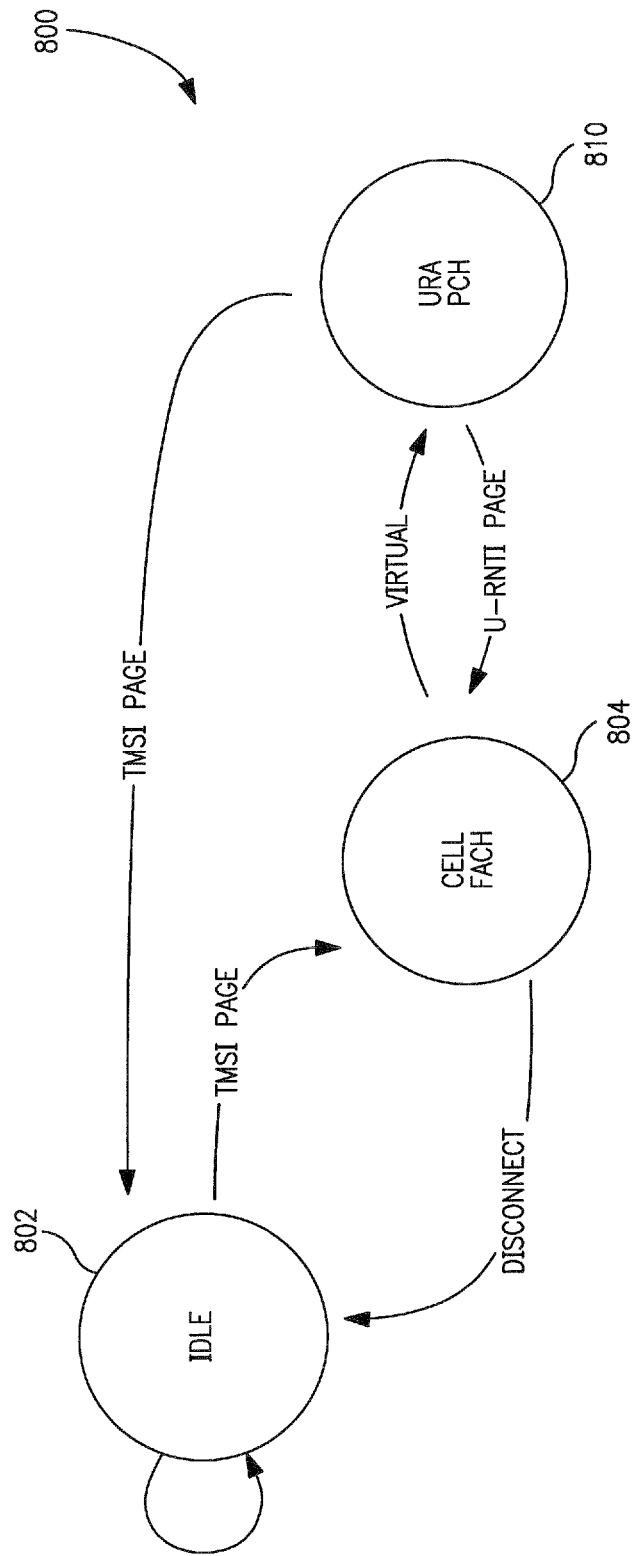
FIG. 8 is a functional block diagram illustrating one embodiment of a finite state machine (FSM) useful for monitoring multiple paging identifiers, in accordance with the methods of FIGS. 5 and 5A.

Referring now to FIG. 8, a simplified fallback state monitoring state machine 800 is shown. As noted above, this state machine describes a subset of the states and transitions for a UMTS based cellular device (UE); other states are not shown. As illustrated, the state machine has three states: (i) CELL_FACH (a connected state) 804, (ii) URA_PCH (a virtually connected state) 810, and (iii) IDLE (a non-connected state) 802. For clarity, the following descriptions describe the transitions into each state; e.g., the triggering conditions.

As illustrated within the simplified state machine 800, during IDLE 802, the UE 402 remains idle and does not maintain a connection with the BS. The UE may transition into IDLE 802 by receiving a RELEASE or DISCONNECT message from the RNC during CELL_DCH 804. The UE may transition into IDLE if the device is power cycled or reset in any state (reset transitions not shown).

During CELL_DCH 804, the UE 402 maintains a connection with the RNC. The UE may transition into CELL_DCH by receiving a page having a TMSI identifier matching its TMSI during the IDLE 802 state. The UE may also transition into CELL_DCH by receiving a page having a U-RNTI identifier matching its U-RNTI identifier during the URA_PCH 810 state.

During URA_PCH 810, the UE 402 maintains a virtual connection with the RNC, where the virtual connection does not require the allocation of a permanent radio resource. The UE may transition into URA_PCH if the UE is assigned a virtual connection (For example, via a PhysicalChannelReconfiguration message to transition to URA_PCH 210) during CELL_DCH 802.

Within the exemplary state machine 800, the UE may also transition into IDLE 802 by receiving a page having a TMSI identifier matching its TMSI during URA_PCH 810. In one variant, the transition from URA_PCH to IDLE requires a reset and re-initialization of the apparatus (i.e., a soft reset). In other variants, the transition from URA_PCH to IDLE retains one or more data for later use (e.g., error logs, prior user identification, etc.). Accordingly, once the UE has returned to the "fallback" IDLE state, the UE proceeds with typical IDLE page detection procedure (e.g., re-authentication, re-registration, etc.).

Forked Status State Machine—

Figure 9:
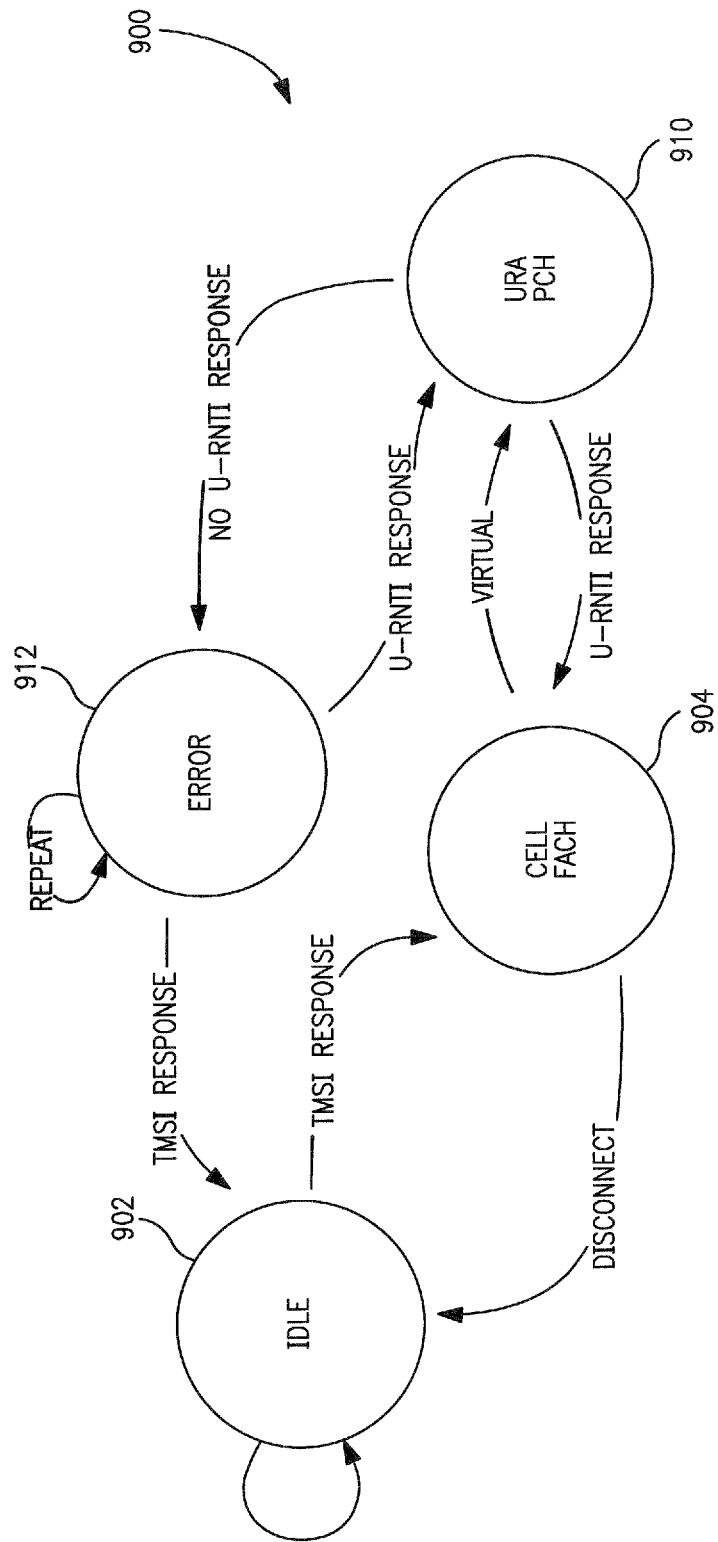
FIG. 9 is a functional block diagram illustrating one embodiment of a finite state machine (FSM) useful for providing multiple forked paging messages, in accordance with the methods of FIGS. 6 and 6A.

In contrast to the simplified fallback state monitoring machine of FIG. 8, a simplified forking status state machine 900 is illustrated in FIG. 9. In the state machine embodiment of FIG. 9, the state machine has four (4) states: (i) CELL_DCH (a connected state) 904, (ii) URA_PCH (a virtually connected state) 910, (iii) IDLE (a non-connected state) 902, and (iv) ERROR 912. It should be noted that while some of these states are named identically to the states of the UE shown in FIG. 8, they are in fact the complementary states of the RNC 404 (as opposed to the UE 402).

For clarity, the following descriptions describe the transitions into each state e.g., the triggering conditions. Moreover, it is appreciated that the RNC actually maintains several independent state machines (one for each served UE).

As illustrated within the simplified state machine 900, during IDLE 902, the RNC 404 does not maintain a connection with the UE 402. The RNC 404 may transition into IDLE by receiving a DISCONNECT request from the UE during CELL_DCH 904. Similarly, the RNC may transition into IDLE if the served UE 402 is non-responsive for any amount of time (e.g., power cycled or reset) during any state. During IDLE, the RNC 404 may initiate connection with the UE by broadcasting a paging message, where the paging message contains the paged UE's TMSI.

During URA_PCH 910, the RNC 404 maintains a virtual connection with the UE, i.e. without consuming radio resources. The RNC may transition into URA_PCH by receiving a request from the UE 402 during CELL_DCH 904. During URA_PCH, the RNC will initiate connection with the UE by broadcasting a paging message, where the paging message contains the paged UE's U-RNTI.

During CELL_DCH 904, the RNC initializes and maintains a connection with the UE. The RNC 700 may transition into CELL_DCH by receiving a response to a paging message from the UE. If the RNC is in IDLE mode 902, the RNC pages the UE with a TMSI paging message (and expects an appropriate response). If the RNC is in URA_PCH mode 910, the RNC 404 pages the UE 402 with a U-RNTI paging message (and expects an appropriate response).

Within the exemplary state machine 900, the RNC state ERROR 912 is included to resolve incorrect paging response. The RNC transitions to ERROR if it has not received a paging response to a U-RNTI paging message during URA_PCH. During ERROR, the BS transmits both TMSI and U-RNTI paging messages. If the UE responds with the U-RNTI paging message response, then the RNC 404 resumes operation with the UE as a momentary disconnection (i.e., via URA_PCH procedures). If the UE 402 responds with the TMSI paging message response, the RNC re-initializes the UE connection (i.e., via IDLE mode procedures).

Business Methods and Rules—

It will be recognized that the foregoing apparatus and methodologies may be readily adapted to various business models.

In one such business paradigm, appropriately enabled user equipment may robustly receive cellular pages (receiving service notifications faster), efficiently monitor existing paging channels, and thereby increase the overall perceived quality of experience. While legacy devices can be effectively incapacitated by service blackouts, and recover slowly, devices implementing the present invention can quickly resume operation. The forgoing approaches are markedly more efficient, and may also significantly improve power consumption by the UE, thereby extending battery life and hence user experience. Such devices can be offered by the network operator or manufacturer as "upgraded" or "premium" devices for this reason, and may even command higher prices and/or subscription fees. Alternatively, they may be offered as an incentive by the network operator to its existing subscribers, such as in exchange for extending the term and/or services associated with their subscription.

The aforementioned apparatus and methodologies may also be readily adapted for operation in accordance with an underlying business rules algorithm or "engine". This business rules engine may comprise for example a software application (and/or firmware or even hardware aspects), and is implemented in one embodiment as a separate entity at the Core Network, or alternatively within an existing entity residing at the Core Network or other network management process (NMP). The rules engine is in effect a high-layer supervisory process which aids the network operator (or other interested party) in making operational decisions or resource allocations based on important criteria such as financial aspects, user experience enhancement, etc.

In one embodiment, the business rules engine is configured to take into account the revenue and/or profit implications associated with providing resources to one or more users. Accordingly, the exemplary business rules engine can modify the paging behaviors of the system to support a wider base of users (e.g., assigning a larger number of users into a virtually connected operation) or alternatively, more robust services (e.g. minimizing virtually connected operation).

For instance, in one example, evaluation of the requests from a population of users for resources (e.g., frequency spectrum) may include an analysis of the incremental cost, revenue, and/or profit associated with the various allocation options. In some cases, the network provider may determine that certain geographical locations are more or less likely to experience paging outages. In such cases, the network provider may determine the commercial value of supporting users that are frequently dropped requires resolution. Alternatively, the network provider may determine that supporting such low probability users is not profitable. These "business rules" may be imposed e.g., at time of resource request, and then maintained for a period of time (or until an event triggering a re-evaluation occurs), or alternatively according to a periodic model.

Myriad other schemes for implementing paging channel recovery will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of correcting state errors during virtually connected operation, the method comprising:
   identifying at least a first state and a second state, the first and second states having a first and second identifier corresponding thereto, respectively, where the first state and the second state comprise different states, and the first identifier and the second identifier comprise different identifiers;
   receiving a first message, the first message including an message identifier;
   wherein:
   when the message identifier matches the first identifier during the first state, executing a first response; and
   when the message identifier matches the second identifier during the first state, executing a corrective response and transitioning to the second state.

2. The method of claim 1, wherein the first state comprises a virtually connected state, the second state comprises an idle state.

3. The method of claim 2, wherein the first response comprises transitioning to a connected state.

4. The method of claim 2, the method further comprising initializing a state machine to track a current state, and wherein the corrective response comprises resetting the current state.

5. The method of claim 4, wherein the corrective response additionally comprises flagging an error.

6. A mobile device configured to detect state errors occurring during virtually connected operation, the mobile device comprising:
   a processor;
   a wireless interface in data communication with the processor; and
   logic in data communication with the processor and the wireless interface, the logic configured to:
   initialize a virtually connected mode with a base station, the virtually connected mode not assigned a dedicated resource for connection with the base station;
   identify a first identifier associated with the virtually connected mode and a second identifier associated with a radio resource connected mode with the base station; and
   receive a message from the base station comprising at least a message identifier;
   wherein:
   when the message identifier is a match with the first identifier, transmit a response associated with the virtually connected mode to the base station; and
   when the message identifier is a match with the second identifier, transmit a corrective response to the base station and transition to the radio resource connected mode from the virtually connected mode.

7. The mobile device of claim 6, wherein the corrective response comprises at least the second identifier.

8. The mobile device of claim 7, wherein the corrective response further comprises the first identifier.

9. The mobile device of claim 6, wherein the first identifier is configured according to a different format than the second identifier.

10. The mobile device of claim 6, wherein the message comprises a request for reconnection with the base station.

11. The mobile device of claim 6, the logic further configured to maintain a state indicator configured to indicate whether the mobile device is configured to operate in the virtually connected mode or the radio resource connected mode.

12. The mobile device of claim 11, wherein the transition to the radio resource connected mode comprises at least an update to a state indicator to indicate the mobile device is configured to operate in the radio resource connected mode.

13. A non-transitory computer readable medium comprising a plurality of instructions configured to detect state errors occurring in a mobile device, the plurality of instructions that when executed, cause the mobile device to:
   initialize a first state;
   identify a first and a second identifier associated with the first state and a second state respectively; and
   receive a message, the message including at least an identifier;
   wherein the instructions are further configured to, when executed, cause the mobile device to:
   issue a response in accordance with the first state when the identifier is a match with the first identifier; and
   issue a response in accordance with the second state and transition from the first state to the second state when the identifier is a match with the second identifier.

14. The computer readable apparatus of claim 13, wherein the received message comprises a reconnection request transmitted from a base station.

15. The computer readable apparatus of claim 14, wherein when the identifier is a match with the second indicator, the match is indicative of a state error in the mobile device.

16. A mobile device configured to detect state errors occurring during virtually connected operation, the mobile device comprising:
   a processor;
   a wireless interface in data communication with the processor; and
   logic in data communication with the processor and the wireless interface, the logic configured to:
   initialize a first connection state of a plurality of connection states;
   determine a first identifier associated with the first connection state of the plurality of connection states, and a second identifier of a second connection state of the plurality of connection states;

receive a request comprising at least a message identifier; and detect an occurrence of a connection state error based at least in part on a comparison between the message identifier and at least one of the first and the second identifiers.

17. The mobile device of claim 16, wherein the first connection state comprises a connection state without dedicated base station resources, and the second connection state comprises a connection state with at least one dedicated base station resource.

18. The mobile device of claim 17, wherein the occurrence of a state error is detected based at least in part on a determination that the message identifier is a match with the second identifier.

19. The mobile device of claim 16, the logic further configured to:

when the occurrence of a connection state error is detected:
transition from the first connection state to the second connection state; and
transmit a corrective response including at least the second identifier.

20. The mobile device of claim 19, the logic further configured to, when the occurrence of a connection state error is detected, update a state status to indicate the mobile device is configured according to the second connection state; and during the initialization of the first connection state, update the state status to indicate the mobile device was configured according to the first connection state.

* * * * *